Patented Aug. 31, 1943

2,328,062

UNITED STATES PATENT OFFICE 2,328,062

CERTAIN WATER-SOLUBLE HIGH MOLAL OXYALKYLATED ESTERS AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application March 21, 1941, Serial No. 384,594. Divided and this application June 26, 1942, Serial No. 448,681

11 Claims. (Cl. 260—404.8)

This invention relates to a new chemical product or compound, our present application being a division of our co-pending application Serial No. 384,594, filed March 21, 1941 which subsequently matured as U. S. Patent No. 2,295,163, dated Sept. 8, 1942.

One object of our present invention is to provide a new material, compound or composition of matter, that is capable of use for various purposes, and particularly adapted for use as a demulsifier in the resolution of crude oil emulsions.

Another object of our invention is to provide a practicable method for manufacturing said new material, compound or composition of matter.

The new chemical compound or composition of matter which constitutes our present invention is exemplified by the acidic, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated, for the sake of convenience, by the formula T.OH, is reacted with a polybasic carboxy acid, which, similarly, may conveniently be indicated as being of the dibasic type, by the formula HOOC.D.COOH, then the fractional ester obtained by reaction between equimolar quantities may be indicated by the following formula:

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience, these polyethylene glycols may be indicated by the following formula:

OH($C_2H_4O$)$_m$H in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

OH($C_nH_{2n}O$)$_m$H in which $m$ has its previous significance and $n$ represents a numeral varying from 2 to 4.

Thus, the bulk of the materials herein contemplated, particularly for use as demulsifiers, may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

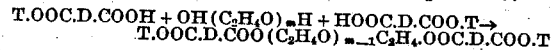

T.OOC.D.COOH + OH($C_2H_4O$)$_m$H + HOOC.D.COO.T→
T.OOC.D.COO($C_2H_4O$)$_{m-1}C_2H_4$.OOC.D.COO.T

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of conveniece, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8–12 oxyalkylene groups, particularly 8–12 oxyethylene groups. The preference to use the oxyethylated compounds is due, largely, to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethlene glycols. These materials are available in the form of a waxy water-soluble material, and the general range may vary somewhat from deca- to tetra-decaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate product may then be considered as a dibasic or polybasic acid. One mole of the intermediate so obtained is then reacted with two moles of the alcoholic material of the kind subsequently described.

It is to be noted, however, that if one prepares the fractional acidic ester, then if two moles of the fractional acidic ester are reacted with one mole of the polyethylene glycol, there is no possibility for the formation of polymeric types of esterification products under ordinary conditions.

The alcoholic compounds employed as reactants in one mode of manufacture of the present compounds, are fractional esters obtained by reaction between detergent-forming acids and polyhydric alcohols.

Detergent-forming acids are monocarboxy acids having more than 8 and not over 32 carbon atoms, and characterized by the fact that they combine with alkalies such as caustic soda, caustic potash, ammonia, triethanolamine, and the like, to produce soap or soap-like materials. The best examples are, of course, the higher fatty acids, such as oleic acid, stearic acid, palmitic acid, etc. In addition to the higher fatty acids, other well-known members of this class include resinic acids, abietic acids, naphthenic acids, and acids obtained by the oxidation of petroleum hydrocarbons and commonly referred to as oxidized wax acids.

Generally speaking, the higher fatty acids are apt to contain from 12–14 carbon atoms as a lower limit, to 18–22 carbon atoms as an upper limit. Oxidized wax acids may contain as many as 32 carbon atoms. For the sake of brevity, reference will be made to superglycerinated fats, although it is understood that similar products obtained from other detergent-forming acids, as well as fatty acids, are just as acceptable.

Superglycerinated fats can be prepared by a number of well-known procedures. One procedure is to react the fatty acid with a suitable polyhydric alcohol. Another procedure is to react an ester, for instance, a glyceride, with an excess of glycerol. Such procedure is sometimes referred to as re-esterification. Other procedures include the use of ethylene oxide, ethylene chlorhydrin, glycerol monochlorhydrin, or the like. Since the manufacture of these products is well known, particularly in view of their utility in a number of industries, it does not appear that further comment is required. However, attention is directed to a trade pamphlet entitled "Polyhydric Alcohol Esters," issued by the Glyco Products Company, 1940. This pamphlet describes numerous fractional esters derived from fatty acids which are particularly adaptable for use as reactants in the present instance. The fatty acid fractional esters therein described and of conventionally recognized definite chemical composition, are as follows: Diethylene glycol (mono) laurate, diethylene glycol (mono) myristate, diethylene glycol (mono) oleate, diethylene glycol (mono) palmitate, diethylene glycol (mono) ricinoleate, diethylene glycol (mono) stearate; ethylene glycol (mono) laurate, ethylene glycol (mono) oleate, ethylene glycol (mono) ricinoleate, ethylene glycol (mono) stearate; glyceryl (mono) laurate, glyceryl (mono) myristate, glycerol (mono) oleate, glyceryl (mono) palmitate, glyceryl (mono) ricinoleate, glyceryl (mono) stearate; propylene glycerol (mono) laurate, propylene glycol (mono) oleate, propylene glycerol (mono) ricinoleate and propylene glycol (mono) stearate.

The materials herein contemplated may be illustrated further by the following examples:

*Acidic intermediate product, Example 1*

One pound mole of nonaethylene glycol is reacted with two pound moles of maleic anhydride, so as to form nonaethylene glycol dihydrogen dimaleate.

*Acidic intermediate product, Example 2*

A mixture of lower non-distillable polyethylene glycols, representing approximately deca- to tetradeca-ethylene glycol, is substituted for nonaethylene glycol in the preceding example.

*Acidic intermediate product, Example 3*

A 50–50 mixture of nonaethylene glycol and lower non-distillable polyethylene glycols of the kind described in the previous example is substituted for nonaethylene glycol in Example 1.

Acidic intermediate product, Example 4

Adipic acid is substituted for maleic anhydride in Examples 1–3, preceding.

Acidic intermediate product, Example 5

Oxalic acid is substituted for maleic anhydride in Examples 1–3, preceding.

Acidic intermediate product, Example 6

Citric acid is substituted for maleic anhydride in Examples 1–3, preceding.

Acidic intermediate product, Example 7

Succinic anhydride is substituted for maleic anhydride in Examples 1–3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent, that carries away the water of esterification which may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well-known procedure and requires no further elaboration.

Composition of matter, Example 1

One pound mole of the intermediate product of the kind described in Intermediate product, Examples 1, 2 and 3, above, is reacted with two pound moles of diethylene glycol monolaurate until all carboxyl acidity has disappeared. Time of reaction may vary from a few hours to as much as 20 hours.

Composition of matter, Example 2

Diethylene glycol monomyristate is substituted for diethylene glycol monolaurate in the preceding example.

Composition of matter, Example 3

Diethylene glycol mono-oleate is substituted for diethylene glycol monolaurate in Composition of matter, Example 1.

Composition of matter, Example 4

Diethylene glycol monopalmitate is substituted for diethylene glycol monolaurate in Composition of matter, Example 1.

Composition of matter, Example 5

Diethylene glycol monoricinoleate is substituted for diethylene glycol monolaurate in Composition of matter, Example 1.

Composition of matter, Example 6

Diethylene glycol stearate is substituted for diethylene monolaurate in Composition of matter, Example 1.

Composition of matter, Example 7

Diethylene glycol glyceryl monostearate is substituted for diethylene glycol monolaurate in Composition of matter, Example 1.

Composition of matter, Example 8

Ethylene glycol mono-oleate is substituted for diethylene glycol monolaurate in Composition of matter, Example 1.

Composition of matter, Example 9

Ethylene glycol monoricinoleate is substituted for diethylene glycol monolaurate in Composition of matter, Example 1.

Composition of matter, Example 10

Glyceryl monolaurate is substituted for diethylene glycol monolaurate in Composition of matter, Example 1.

Composition of matter, Example 11

Glyceryl mono-oleate is substituted for diethylene glycol monolaurate in Composition of matter, Example 1.

Composition of matter, Example 12

The same procedure is followed as in Composition of matter, Examples 1–11, inclusive, except that intermediate product of the kind exemplified by Intermediate product, Example 4, is substituted for that in Intermediate product, Examples 1, 2 and 3.

Composition of matter, Example 13

The same procedure is followed as in Composition of matter, Examples 1–11, inclusive, except that intermediate product of the kind exemplified by Intermediate product, Example 5, is substituted for that in Intermediate product, Examples 1, 2 and 3.

Composition of matter, Example 14

The same procedure is followed as in Composition of matter, Examples 1–11, inclusive, except that intermediate product of the kind exemplified by Intermediate product, Example 6, is substituted for that in Intermediate product, Examples 1, 2 and 3.

Composition of matter, Example 15

The same procedure is followed as in Composition of matter, Examples 1–11, inclusive, except that intermediate product of the kind exemplified by Intermediate product, Example 7, is substituted for that in Intermediate product, Examples 1, 2 and 3.

It is to be noted that this second step is an esterification reaction, and the same procedure is employed as suggested above in the preparation of the intermediate product. Needless to say, any particular method may be used to produce the desired compounds of the kind indicated. In some instances, it may be desirable to conduct the esterification reaction in the presence of a non-volatile inert solvent which simply acts as a diluent or viscosity reducer.

In the preceding examples, attention has been directed primarily to the monomeric form, or at least, to the form in which the bifunctional alcohol, i. e., a glycol, and the polyfunctional acid, usually a bifunctional compound, react to give a chain type compound, in which the adjacent acid and glycol nucleous occur as a structural unit. For instance, in the monomeric form this may be indicated in the following manner:

acid _____ glycol _____ acid

If, however, one prepared an intermediate product employing the ratio of three moles of maleic anhydride and two moles of nonaethyleneglycol, the tendency would be to produce a product which might be indicated in the following manner:

acid ____ glycol ____ acid ____ glycol ____ acid

Similarly, three moles of the glycol and four moles of the acid might tend to give a combination which may be indicated thus:

acid __glycol __ acid __glycol__acid__glycol__acid

Another way of stating the matter is that the composition may be indicated in the following manner:

in which the characters have their previous significance and $x$ is a relatively small whole number less than 10 and probably less than 5; and in the monomeric form $x$, of course, is 1. The limitations on the size of $x$ are probably influenced largely by the fact that reaction leading to further growth is dependent upon random contact.

Some of the products are self-emulsifiable oils or self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid;

(d) By using an alcoholic material of lower molecular weight, for instance, ethylene glycol monolaurate, instead of ethylene glycol monostearate;

(e) By using a material such as diethylene glycol mono-oleate or glyceryl mono-oleate, instead of ethylene glycol mono-oleate.

In any event, it is to be noted that the compounds of the type herein contemplated are limited to the water-soluble type, i. e., those which are self-emulsifying in water, or produce a sol or a molecular solution.

Incidentally, one obvious fact may be conveniently emphasized at this point; and that is that the hydroxylated aliphatic esters of the detergent-forming acids employed to combine with nonaethylene glycol dihydrogen dimaleate or similar materials, must be of the water-insoluble type. In other words, it is not intended to include esters of the kind obtained by reaction of ethylene oxide on oleic acid or the like with the formation of a large number of recurring ether linkages so as to obtain water solubility.

It is to be noted that the higher fatty acids include blown fatty acids, or superglycerinated esters obtained from blown oils. As to the specific description of this particular type of material which may be used as a reactant, see U. S. Patent No. 2,208,509, dated July 16, 1940, to Blair and Boydstun.

As herein used, the term "polyhdric alcohol" refers to aliphatic alcohols containing two or more hydroxyl groups, and is intended to include such compounds as glycerol, ethylene glycol, beta-methyl glycerol, 1,3 propanediol, pentamethylene glycol, alpha, beta, gamma pentanetriol, sorbitol, mannitol, and the like, and also the polyhydroxy ether alcohols, such as diglycerol, triglycerol, tetraglycerol, diethylene glycol, etc. Such polyhydric ether alcohols may also be produced by ether formation from two or more different polyhydric alcohols to yield compounds, such as ethylene glycol monoglyceryl ether, 1,3 propanediol monoethylene glycol ether, diethylene glycol monoglyceryl ether, etc. Suitable polyhydroxy ether alcohols may also be produced from a polyhydric alcohol containing three or more hydroxyls and a monohydric alcohol. Examples of such compounds are glycerol monobutyl ether, glycerol monoalkyl ether, pentanetriol monoethyl ether, diglycerol monopropyl ether, etc.

Actually, a reaction involving an alcohol and an acid (esterification) may permit small amounts of either one or both of the reactants, depending upon the predetermined proportion, to remain in an unreacted state. In the actual prepartion of compositions of the kind herein contemplated, any residual acidity can be removed by any suitable base, for instance, ammonia, triethanolamine, or the like, especially in dilute solution. Naturally, precaution should be taken, so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

We have found that the particular chemical compounds or reagents herein described and desirable for use as demulsifiers may also be used for other purposes, for instance, as a break inducer in doctor treatment of the kind intended to sweeten gasoline. See U. S. Patent No. 2,157,223, dated May 9, 1939, to Sutton.

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants in combination with mineral acid or acidization of oil-bearing strata, reference is made to U. S. Patent No. 2,233,383, dated February 25, 1941, to De Groote and Keiser.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances, gives increased resistance, to soluble calcium and magnesium salts, for such property is of particular value. Usually, however, neutralization with a dilute solution of ammonia or the like is just as practicable and less expensive.

In the hereto attached claims, four types of primary reactants are referred to, to wit, monocarboxy detergent-forming acids, polyhydric alcohols, polyethylene glycols and polybasic carboxylic acids. The fractional esters derived from the monocarboxy acids and the polyhydric alcohols are referred to in the claims as "alcoholic intermediates" insofar that they contain an alcoholiform hydroxyl radical. The fractional esters derived from the polyethylene glycols and the polybasic carboxylic acids are referred to in the claims as "acidic intermediates," since they possess a free carboxyl radical. In the hereto attached claims the water-soluble ester referred to is the product resulting from the interaction of the aforementioned alcoholic and acidic intermediates.

Having thus described our invention, what we claim as new and desire to secure by Letters Patent is:

1. A water-soluble ester, being the resultant of two intermediate reactants, to wit, an acidic intermediate reactant and an alcoholic intermediate reactant; said acidic intermediate reactant being in turn the resultant fractional ester of two primary reactants, one being alcoholic and the other acidic; and said primary alcoholic reactant consisting of a polyalkylene glycol having at least 7 and not more than 17 ether linkages; and the alkylene radical thereof containing at least 2 and not more than 6 carbon atoms; and the acidic primary reactant being a polybasic carboxy acid having not more than 6 carbon atoms; and the ratio of the said primary esterifying reactants being within the range of more than 1 mole and not over 2 moles of the polybasic acid for each mole of the polyalkylene glycol; and said intermediate alcoholic reactant being the fractional ester of two additional primary reactants, and likewise, one being acidic and the other alcoholic, to wit, a detergent-forming monocarboxy acid having more than 8 and not more than 32 carbon atoms and a polyhydric alcohol having at least 2 and not more than 12 carbon atoms; the ratio of intermediate reactants being two moles of the alcoholic intermediate reactant for each mole of the acidic intermediate reactant.

2. A neutral water-soluble ester, being the resultant of two intermediate reactants, to wit, an acidic intermediate reactant and an alcoholic intermediate reactant; said acidic intermediate reactant being in turn the resultant fractional ester of two primary reactants, one being alcoholic and the other acidic; and said primary alcoholic reactant consisting of a polyalkylene glycol having at least 7 and not more than 17 ether linkages; and the alkylene radical thereof containing at least 2 and not more than 6 carbon atoms; and the acidic primary reactant being a polybasic carboxy acid having not more than 6 carbon atoms; and the ratio of the said primary esterifying reactants being within the range of more than 1 mole and not over 2 moles of the polybasic acid for each mole of the polyalkylene glycol; and said intermediate alcoholic reactant being the fractional ester of two additional primary reactants, and likewise, one being acidic and the other alcoholic, to wit, a detergent-forming monocarboxy acid having more than 8 and not more than 32 carbon atoms and a polyhydric alcohol having at least 2 and not more than 12 carbon atoms; the ratio of intermediate reactants being two moles of the alcoholic intermediate reactant for each mole of the acidic intermediate reactant.

3. A neutral water-soluble ester, being the resultant of two intermediate reactants, to wit, an acidic intermediate reactant and an alcoholic intermediate reactant; said acidic intermediate reactant being in turn the resultant fractional ester of two primary reactants, one being alcoholic and the other acidic; and said primary alcoholic reactant consisting of a polyalkylene glycol having at least 7 and not more than 17 ether linkages; and the alkylene radical thereof containing at least 2 and not more than 6 carbon atoms; and the acidic primary reactant being a dibasic carboxy acid having not more than 6 carbon atoms; and the ratio of said primary esterifying reactants being within the range of more than 1 mole and not over 2 moles of the dibasic acid for each mole of the polyalkylene glycol; and said intermediate alcoholic reactant being the fractional ester of two additional primary reactants, and likewise, one being acidic and the other alcoholic, to wit, a detergent-forming monocarboxy acid having more than 8 and not more than 32 carbon atoms and a polyhydric alcohol having at least 2 and not more than 12 carbon atoms; the ratio of intermediate reactants being two moles of the alcoholic intermediate reactant for each mole of the acidic intermediate reactant.

4. A neutral water-soluble ester, being the resultant of two intermediate reactants, to wit, an acidic intermediate reactant and an alcoholic intermediate reactant; said acidic intermediate reactant being in turn the resultant fractional ester of two primary reactants, one being alcoholic and the other acidic; and said primary alcoholic reactant consisting of a polyethylene glycol having at least 7 and not more than 17 ether linkages; and the acidic primary reactant being a dibasic carboxy acid having not more than 6 carbon atoms; and the ratio of the said primary esterifying reactants being within the range of more than 1 mole and not over 2 moles of the dibasic acid for each mole of the polyethylene glycol; and said intermediate alcoholic reactant being the fractional ester of two additional primary reactants, and likewise, one being acidic and the other alcoholic, to wit, a detergent-forming monocarboxy acid having more than 8 and not more than 32 carbon atoms and a polyhydric alcohol having at least 2 and not more than 12 carbon atoms; the ration of intermediate reactants being two moles of the alcoholic intermediate reactant for each mole of the acidic intermediate reactant.

5. A neutral water-soluble ester, being the resultant of two intermediate reactants, to wit, an acidic intermediate reactant and an alcoholic intermediate reactant; said acidic intermediate reactant being in turn the resultant fractional ester of two primary reactants, one being alcoholic and the other acidic; and said primary alcoholic reactant consisting of a polyethylene glycol having at least 7 and not more than 17 ether linkages; and the acidic primary reactant being a dibasic carboxy acid having not more than 6 carbon atoms; and the ratio of the said primary esterifying reactants being within the range of more than 1 mole and not over 2 moles of the dibasic acid for each mole of the polyethylene glycol; and said intermediate alcoholic reactant being the fractional ester of two additional primary reactants, and likewise, one being acidic and the other alcoholic, to wit, a higher fatty acid having more than 8 and not more than 32 carbon atoms and a polyhydric alcohol having at least 2 and not more than 12 carbon atoms; the ratio of intermediate reactants being two moles of the alcoholic intermediate reactant for each mole of the acidic intermediate reactant.

6. A chemical compound as defined in claim 5 and of the following structural formula:

TOOC.D.COO[(C₂H₄O)ₘC₂H₄OOC.D.COO]ₓT in which T is the intermediate alcoholic reactant residue and D is the dibasic acid residue and m represents a numeral varying from 7 to 12 and x is a small whole number less than 10.

7. A chemical compound as defined in claim 5 and of the following structural formula:

TOOC.D.COO(C₂H₄O)ₘC₂H₄OOC.D.COO.T in which T is the intermediate alcoholic reactant residue and D is the dibasic acid residue and m represents a numeral varying from 7 to 12.

8. A chemical compound as defined in claim 5 and of the following structural formula:

TOOC.D.COO(C₂H₄O)ₘC₂H₄OOC.D.COO.T in which T is the intermediate alcoholic reactant residue and D is a maleic acid residue and m represents a numeral varying from 7 to 12.

9. A chemical compound as defined in claim 5 and of the following structural formula:

TOOC.D.COO(C₂H₄O)ₘC₂H₄OOC.D.COO.T in which T is the intermediate alcoholic reactant residue and D is a succinic acid residue and m represents a numeral varying from 7 to 12.

10. A chemical compound as defined in claim 5 and of the following structural formula:

TOOC.D.COO(C₂H₄O)ₘC₂H₄OOC.D.COO.T in which T is the intermediate alcoholic reactant residue and D is an adipic acid residue and m represents a numeral varying from 7 to 12.

11. In the manufacture of a water-soluble ester, being the resultant of two intermediate reactants, to wit, an acidic intermediate reactant and an alcoholic intermediate reactant; said acidic intermediate reactant being in turn the resultant fractional ester of two primary reactants, one being alcoholic and the other acidic; and said primary alcoholic reactant consisting of a polyalkylene glycol having at least 7 and not more than 17 ether linkages; and the alkylene radical thereof containing at least 2 and not more than 6 carbon atoms; and the acidic primary reactant being a polybasic carboxy acid having not more than 6 carbon atoms; and the ratio of the said primary esterifying reactants being within the range of more than 1 mole and not over 2 moles of the polybasic acid for each mole of the polyalkylene glycol; and said intermediate alcoholic reactant being the fractional ester of two additional primary reactants, and likewise, one being acidic and the other alcoholic, to wit, a detergent-forming monocarboxy acid having more than 8 and not more than 32 carbon atoms and a polyhydric alcohol having at least 2 and not more than 12 carbon atoms; the ratio of intermediate reactants being two moles of the alcoholic intermediate reactant for each mole of the acidic intermediate reactant, the steps of: (A) esterifying the polyhydric alcohol with the detergent-forming monocarboxy acid to yield the alcoholic intermediate reactant; (B) reacting the polyalkylene glycol with the polybasic carboxy acid to yield the acidic intermediate reactant; and (C) subsequently reacting said intermediate reactants to yield the water-soluble ester.

MELVIN DE GROOTE.
BERNHARD KEISER.